United States Patent [19]

Chen et al.

[11] 4,322,344

[45] Mar. 30, 1982

[54] PREPARATION OF CHEMICALLY PHOSPHORYLATED SOY PROTEINS AND THE PRODUCTS THEREFROM

[76] Inventors: Hsien-Jer Chen; Tin-Yin Liu; Hsien-Yi Sung; Jong-Ching Su, all of P.O. Box 246, Hsin-chu, Taiwan

[21] Appl. No.: 240,378

[22] Filed: Mar. 4, 1981

[51] Int. Cl.$^3$ .............................................. A23J 1/14
[52] U.S. Cl. ................................ 260/123.5; 426/634; 426/653; 426/656
[58] Field of Search ...................................... 260/123.5

[56] References Cited

U.S. PATENT DOCUMENTS

| | | | |
|---|---|---|---|
| 2,377,624 | 6/1945 | Gordon | 260/112 R |
| 2,429,579 | 10/1947 | Horvath | 260/123.5 X |
| 2,431,119 | 11/1947 | Horvath | 260/123.5 X |
| 2,768,997 | 10/1956 | Reeves et al. | 260/123.5 X |
| 3,361,574 | 1/1968 | Paulsen | 260/123.5 X |
| 3,674,509 | 7/1972 | Miller | 260/123.5 X |

*Primary Examiner*—Howard E. Schain
*Attorney, Agent, or Firm*—Cushman, Darby & Cushman

[57] ABSTRACT

Chemically phosphorylated soy protein products with much improved functional properties and useful in food industries can be prepared through series of steps: (1) isoelectric washing the defatted soy flour, (2) extracting the proteins present in defatted soy flour in an aqueous medium of the extreme pH value below or above the isoelectric point of soy proteins, (3) alkalifying the extract of soy proteins to pH 11–12 by the addition of concentrated alkali in a short time, (4) modifying the extracted soy proteins under alkaline condition and at ambient temperature by the addition of powdered sodium trimetaphosphate as a phosphorylating agent and (5) recovering the phosphorylated soy protein products by isoelectric washing and final spray-drying as a powder.

5 Claims, 1 Drawing Figure

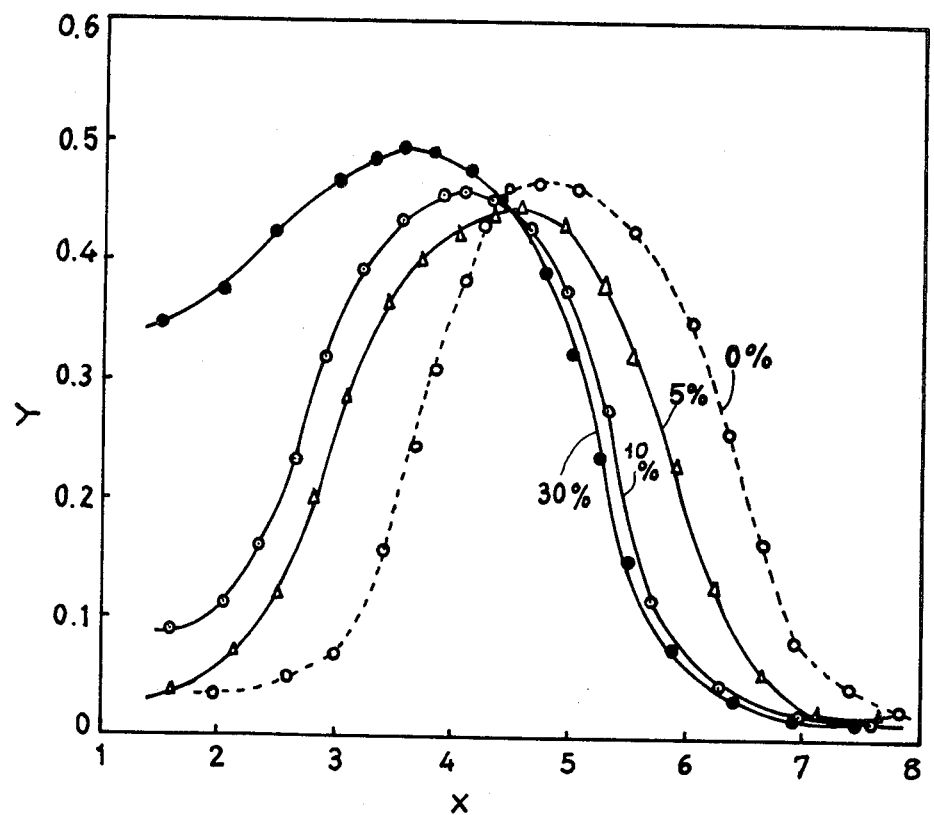

PREPARATION OF CHEMICALLY PHOSPHORYLATED SOY PROTEINS AND THE PRODUCTS THEREFROM

BACKGROUND OF THE INVENTION

This invention relates to a process for the preparation of chemically modified soy proteins with improved functional properties. Currently, intensive research on food proteins is aimed to improve the functional properties of cheaper proteins so as to extend their processing adaptability and diversify their applications in food industries. The so-called functional property or functionality is any property of a substance, besides its nutritional ones, that affects its utilization. Such a property may be exemplified as foaming, whipping, emulsifying, gelling, fat and water absorption, adhesion, elasticity, film-forming or texturization, etc. Soybean protein is found to have many excellent intrinsic functional properties so that it is widely used as an ingredient to impart one or more functional characteristics of specific classes of formulated foods such as bakery, beverage, salad dressings, snacks, texturized meat analogs or extenders and many other processed foods. But the present commercialized soy protein concentrates or isolates can not completely replace casein or other animal proteins for food processing use. The reason is that soy protein is more or less denatured by organic solvent or heat treatment during early defatting process so that soy protein concentrates or isolates thus prepared from defatted soy flour will have a poor aqueous dispersibility and not reveal their deserved functionalities. Currently, some effective modifying methods available for improving the functional properties of soy proteins may comprise enzymatic partial hydrolysis of proteins by proteolytic enzymes and chemical sulfonation with sodium sulfite or succinylation with succinic anhydride. Specifically, the sulfonate or succinate anions covalently bonded onto cystine or lysine residues of proteins tend to increase in net negative charge of the polypeptide chains, which consequently alter the physiochemical character of the proteins resulting in an enhanced aqueous solubility and/or dispersibility and subsequent changes in emulsifying and foaming capacity. However, the enzymatic modifications may produce small bitter peptides. The chemical modifications as aforementioned may impair nutritional value of proteins. Hence, the sulfonated or succinylated proteins which are intended primarily as functional ingredients should not constitute a significant source of nutritive protein in fabricated foods.

SUMMARY OF THE INVENTION

The object of the present invention is to provide a chemical method to phosphorylate soy proteins with cyclic sodium trimetaphosphate in an alkaline aqueous medium and at ambient temperature so as to improve the functional properties of soy protein without impairing the nutritional availability thereof.

BRIEF DESCRIPTION OF THE DRAWING

The single FIGURE shows the pH-turbidity profile of soy proteins with different extents of phosphorylation in aqueous solution.

DESCRIPTION OF THE PREFERRED EMBODIMENTS

The majority of soy proteins are globulins with isoelectric points ranging from pH 4.5 to 5.0. Therefore, the aqueous solubility of soy proteins is not so good in solution of pH values from 2.5 to 7.0. However, when the pH value of extracting aqueous solution is adjusted to either 2.0–2.5 or 11–12, the soy proteins, especially those have been denatured by organic solvent or heat treatment during defatting process, may be dissociated into their subunits having lower molecular weight ranging from about 40,000 to 60,000. By taking the advantage of this characteristics, the defatted soy flour, either denatured or undenatured, can be first isoelectrically washed for several times to remove the soluble matters or pigments, then tenfold quantity of water is added to the washed precipitate and adjusted the pH to either 2.0–2.5 or 11.0–12.0 by titrating with 2 N HCl or 40% NaOH, respectively. Seventy-five to eighty percent of proteins present in raw defatted soy flour can be effectively extracted after stirring for 30 minutes. Then, five to fifty percent of powdered sodium trimetaphosphate on the dry basis of raw defatted soy flour is added into the extracted protein solution to act as a phosphorylating agent. The phosphorylation carries out at pH 11.0–12.0 and 15°–50° C., preferably 30°–35° C., for 1–4 hours, preferably 2–3 hours. The pH value must be kept constant by occassionally titrating with 40% NaOH because pH drops gradually during phosphorylation. Higher reacting temperature of pH value will cause either aggregation of proteins or degradation of reagents. In order to elucidate the mechanism of phosphorylation, free amino acids may substitute soy proteins for phosphorylation as aforementioned. From the products identified by cellulose thin layer chromatography or amino acids autoanalyzer, it is concluded that there are two phosphorylating reactions predominantly undergoing in the present invention. First, the serine residue in soy protein reacts irreversibly with sodium trimetaphosphate in alkali to form a stable phosphomonoester and an equivalent byproduct of pyrophosphate as follows:

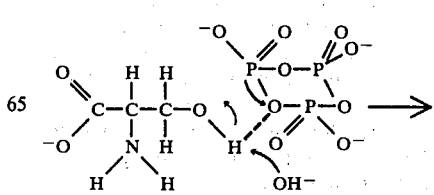

-continued

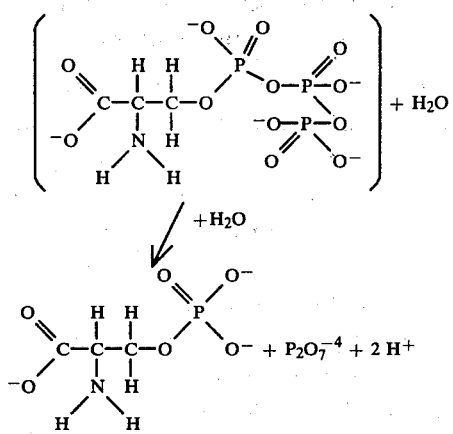

Secondly, the lysine residue in soy protein reacts with sodium trimetaphosphate in alkali to form an acid-labile triphosphoramidate which will be reversibly hydrolyzed to release free lysine in a weakly acidic solution as follows:

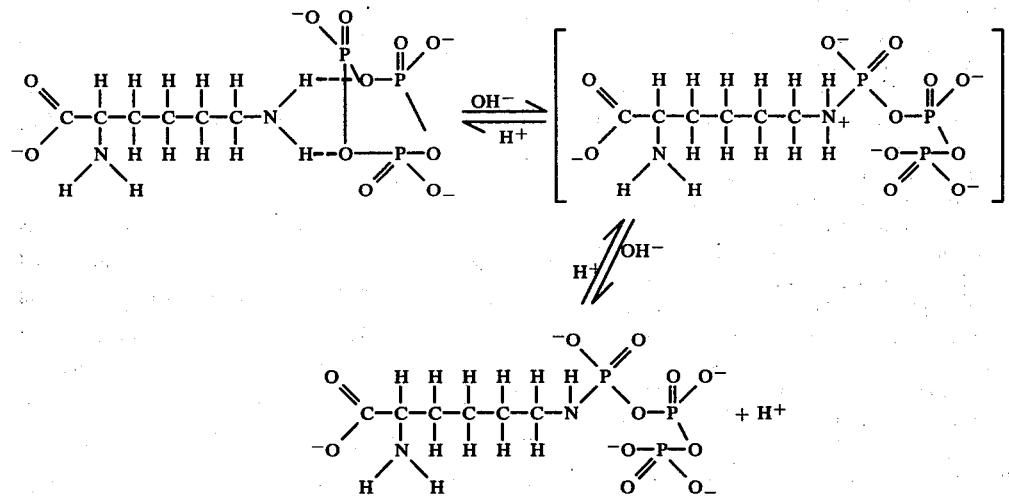

As to other alcoholic or basic amino acid residues, a negligible amount of phosphorylation was observed.

For determining the extent of phosphorylation, aliquots (5 ml) of the reaction mixture were taken for the quantitative analysis of total amount of serine and pyrophosphate. Serine analysis was performed on a Beckman Model 120C amino acid analyzer after the sampled soy proteins were hydrolyzed by 6 N HCl at 110° C. for 24 hours. Separately, the pyrophosphate anion was precipitated as zinc pyrophosphate by adding excess zinc acetate at pH 3.8 or 3.9. The precipitate was dissolved in ammonia solution and titrated with EDTA, using Solochrome Black T as an indicator. This method is suitable for the determination of pyrophosphate in the presence of ortho- and trimetaphosphates. The extent of phosphorylation (% EP) is expressed as the percentage of the molar ratio of pyrophosphate and serine contained in a same volume of reaction solution. In the process of this invention, two or three hours of reacting time is enough to reach a maximum extent, i.e. 35-40% of phosphorylation under the best condition. The single FIGURE shows the pH-turbidity profile of soy proteins with different extents of phosphorylation. The abscissa indicates the pH values of the protein solution and the ordinate indicates the spectrophotometric absorbance of the protein solution at 600 nm wavelength (protein concentration was 0.025%). It is obvious that the aqueous solubility of soy proteins at neutral or weakly acidic pH values was significantly enhanced as the extent of phosphorylation increased. Meanwhile, phosphorylation shifts the isoelectric points of soy proteins approximately 0.8 pH unit, i.e. from 4.5-5.0 to 3.7-4.2.

At last, the phosphorylated soy proteins can be recovered by isoelectric precipitation and spray dried with usual method. Simultaneously, the residual inorganic pyrophosphate and trimetaphosphate can be completely removed at the final step of isoelectric precipitation.

The present invention is illustrated in details in the following examples:

EXAMPLE 1

One kilogram of defatted soy flour with nitrogen solubility index (NSI) 90 and ten liters of water were mixed in a reactor. After adjusting the pH value to 4.5 with 2 N HCl and stirring at 35° C. for 20 minutes, centrifugation was employed to obtain the precipitate. Such an isoelectric washing was repeated for three times until the supernatant was clear. To the precipitate, another 10 liters of water was added and pH value was lowered to 2.0 by adding 2 N HCl. After stirring for 30 minutes and following centrifugation, the pH value of supernatant was adjusted from 2.0 to 11.5 by the addition of enough amount of 40% NaOH in a short time under rapid stirring. 100 grams of powdered sodium trimetaphosphate was added thereafter. The reaction mixture was continuously stirred at 35° C. for 2 hours. During phosphorylation, the pH was maintained at 11.5 with 40% NaOH. After the reaction was completed, the pH value was slowly lowered to 4.5 to precipitate proteins. The precipitated protein curd of which the extent of phosphorylation was determined to be 30% was recovered by repeated isoelectric washing and spray dried after neutralization by usual method. The recovery percentage was about 70-75% based on the crude proteins content in raw material.

The properties of phosphorylated soy protein isolates (Sample A) prepared thereof were summarized in Table 1. No difficulties were encountered when this procedure was scaled-up using the appropriate proportions of ingredients.

EXAMPLE 2

The defatted soy flour with NSI 25 was isoelectrically washed and phosphorylated according to the method described in Example 1. The properties of phosphorylated soy protein isolates (Sample B) thus obtained were also summarized in Table 1. Comparing the properties of soy protein isolates with or without phosphorylating modification, it is obvious that the functional properties of soy protein isolates can be significantly improved through chemical modification by using sodium trimetaphosphate as a phosphorylating agent. Practically, it was found that both the phosphorylated soy protein isolates prepared according to methods described in Example 1 and 2 can be successfully extended to act as a replacer for sodium caseinate and to diversify their applications in coffee whitener, salad dressing, yellow cake, whipped topping or other processed foods.

TABLE 1

Characteristic properties of native and phosphorylated soy protein isolates

|  | Soy protein isolates A | | Soy protein isolates B | |
| --- | --- | --- | --- | --- |
|  | native (control) | phospho-rylated | native (control) | phospho-rylated |
| Nitrogen solubility index | 65.3 | 84.0 | 42.1 | 78.4 |
| Water hydration capacity(g $H_2O$/g protein) | 7.5 | 13.0 | 5.9 | 11.7 |
| Emulsifying capacity (g oil/g protein) | 120 | 280 | 143 | 265 |
| Emulsion stability(%) | 60.0 | 89.1 | 71.9 | 89.4 |
| Foam expansion (ml) | 28.0 | 59.0 | 16.0 | 55.0 |
| Foam stability (%) | 55.3 | 90.0 | 56.0 | 87.6 |
| Digestibility* | 87.7 | 88.8 | 88.5 | 89.6 |

*digested in vitro by trypsin-chymotrypsin-peptidase multienzymes system.

EXAMPLE 3

The defatted soy flour (100 mesh) with either denatured or undenatured proteins was isoelectrically washed and phosphorylated as the method described in Example 1, besides that the step of extracting proteins at pH 2.0 was omitted. The soy protein concentrates prepared thereof were found to have an excellent aqueous dispersibility.

The present invention has the following advantages:

(1) Using sodium trimetaphosphate as a phosphorylating agent can provide a simple and economical method to modify soy proteins resulting in significant improvement of functional properties. Furthermore, the cyclic trimetaphosphate was found to have fewer physiological effects and less toxic than any other straight-chain polyphosphate used in food additives.

(2) Either denatured or undenatured proteins comprised in defatted soy flour can be effectively extracted and modified through phosphorylation described in the present invention.

(3) During phosphorylation, the lysine residue in soy proteins may reversibly bind with trimetaphosphate to form an acidlabile triphosphoramidate derivative and the available lysine may be thus protected from being damaged in alkali. The phosphoramidic bonding will be readily hydrolyzed in situ to release free lysine residue and reveal its nutritional availability at the final step of isoelectric precipitation. Simultaneously, the residual pyrophosphate and excess trimetaphosphate can be completely removed at the same step, too.

We claim:

1. A process for the preparation of chemically modified soy proteins which comprises:
   (a) isoelectrically aqueous washing the defatted soy flour,
   (b) extracting the proteins from defatted soy flour in aqueous medium of pH either 2.0–2.5 or 11.0–12.0,
   (c) adding the powdered sodium trimetaphosphate to the protein extract and readjusting the pH value to 11.0–12.0 in a short time by the addition of 40% NaOH and keeping at 15°–50° C. for 1–4 hours, and
   (d) recovering the phosphorylated soy proteins from reaction solution by isoelectric precipitation and spray drying.

2. A process as claimed in claim 1, wherein sodium trimetaphosphate is used as a phosphorylating agent, and its adding quantity is 5–50%, preferably 15–30%, on the dry basis of raw defatted soy flour.

3. A process as claimed in clam 1, wherein the phosphorylation carries out in aqueous medium of pH value from 11.0 to 12.0 and at 15°–50° C., preferably 30°–35° C., for 1–4 hours, preferably 2–3 hours.

4. A process as claimed in claim 1, wherein the phosphorylated soy protein is recovered by isoelectric precipitation and spray drying.

5. A product of phosphorylated soy protein when prepared by a process as claimed in claim 1.

* * * * *